Aug. 26, 1947.  W. H. SILVER  2,426,530
POWER LIFT
Original Filed May 21, 1942   3 Sheets-Sheet 2
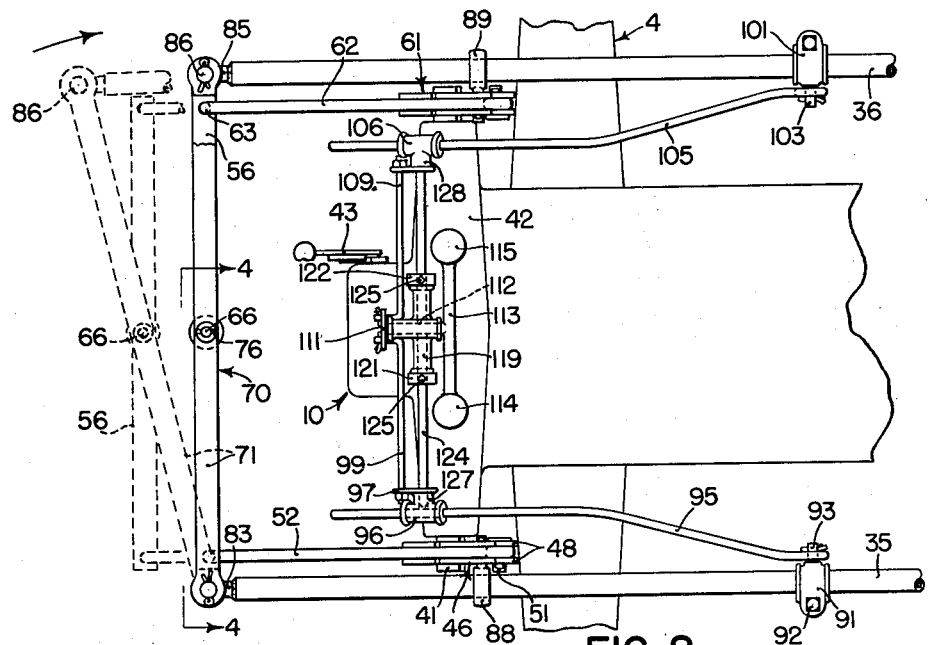
FIG. 2
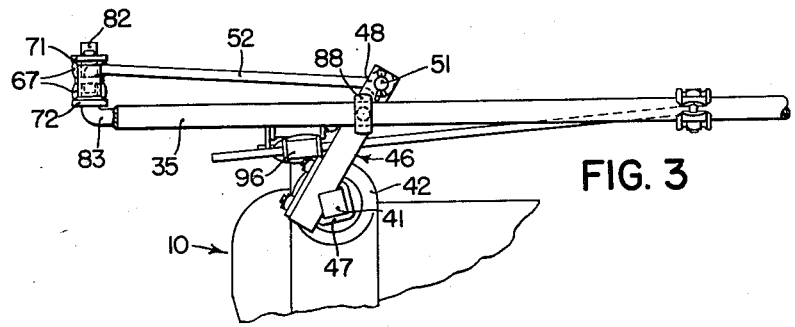
FIG. 3
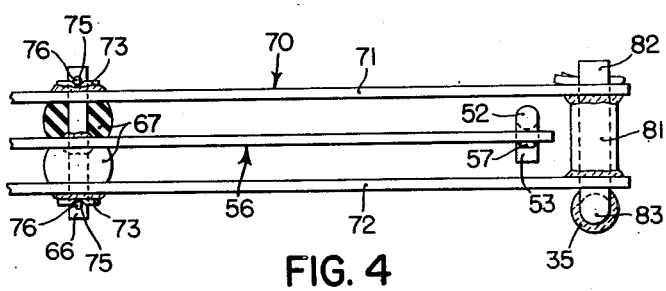
FIG. 4
INVENTOR
WALTER H. SILVER
ATTORNEYS Aug. 26, 1947.    W. H. SILVER    2,426,530
POWER LIFT
Original Filed May 21, 1942    3 Sheets-Sheet 3
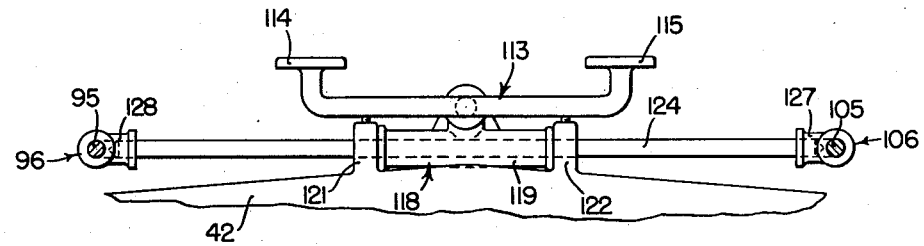
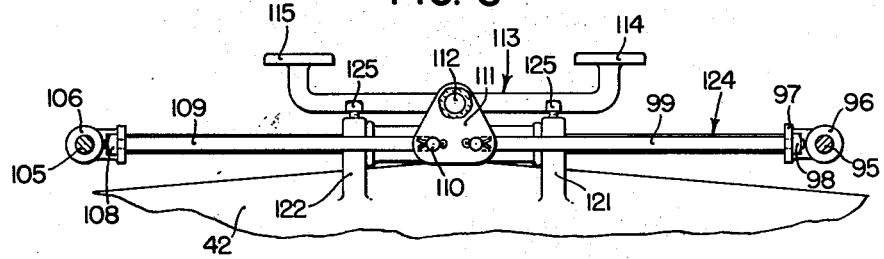
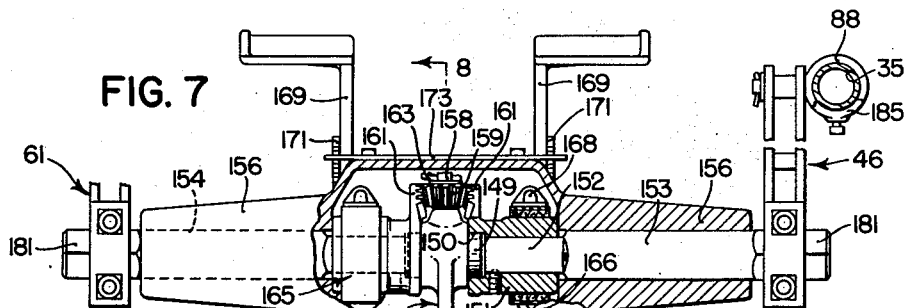
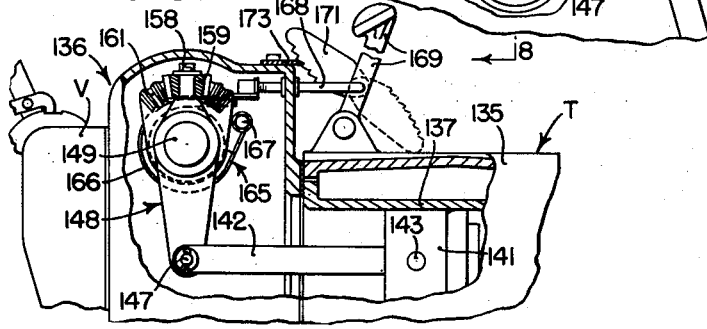
INVENTOR
WALTER H. SILVER
BY
ATTORNEYS Patented Aug. 26, 1947

2,426,530

UNITED STATES PATENT OFFICE 2,426,530

POWER LIFT

Walter H. Silver, Moline, Ill., assignor to Deere & Company, Moline, Ill., a corporation of Illinois Continuation of application Serial No. 443,993, May 21, 1942. This application October 2, 1944, Serial No. 556,850

10 Claims. (Cl. 97—50)

1

This application is a continuation of my co-pending application, Serial No. 443,993, filed May 21, 1942.

The present invention relates generally to agricultural implements and more particularly to implements having operating units and power mechanism for controlling them.

The object and general nature of the present invention is the provision of new and improved tool controlling means which is so arranged that either or both of the tools may be raised or lowered, as desired. This is a particular feature of the present invention and is especially advantageous in a cultivator in which, due to terraces, drainage ditches, and the like, there may be a considerable number of point rows. More specifically, it is a feature of this invention to provide a power-operated lifting unit connected with two tool units through differential means, in connection with optionally controlled locks or latches, one for each tool unit, whereby when one tool unit is held against movement the power of the lifting unit is diverted to the other unit. In this way, either or both of the tool units may be raised as desired, or they may be raised one at a time in any sequence.

Another feature of this invention is the provision of a pair of implement shifting parts connected by differential means with a single power operated unit of a tractor, together with suitably controlled brakes or locks associated, respectively, with the implement shifting parts.

These and other objects and advantages of the present invention will be apparent to those skilled in the art after a consideration of the following detailed description, taken in conjunction with the accompanying drawings, in which Figure 1 is a plan view of a two-row tractor mounted cultivator in which the principles of the present invention have been incorporated;

Figure 2 is an enlarged fragmentary rear plan view showing the details of the locking mechanism;

Figure 3 is a side view of the mechanism shown in Figure 2;

Figure 4 is a view taken generally along the line 4—4 of Figure 2;

Figures 5 and 6 are fragmentary enlarged views taken, respectively, from the front and rear of the locking means;

Figure 7 shows a modified form of the present invention wherein a pair of separate rockshafts are provided with a differential connection to a power unit, and enclosed locks for controlling the movement of each rockshaft independently of the other; and Figure 8 is a view taken generally along the line 8—8 of Figure 7.

Figure 1:
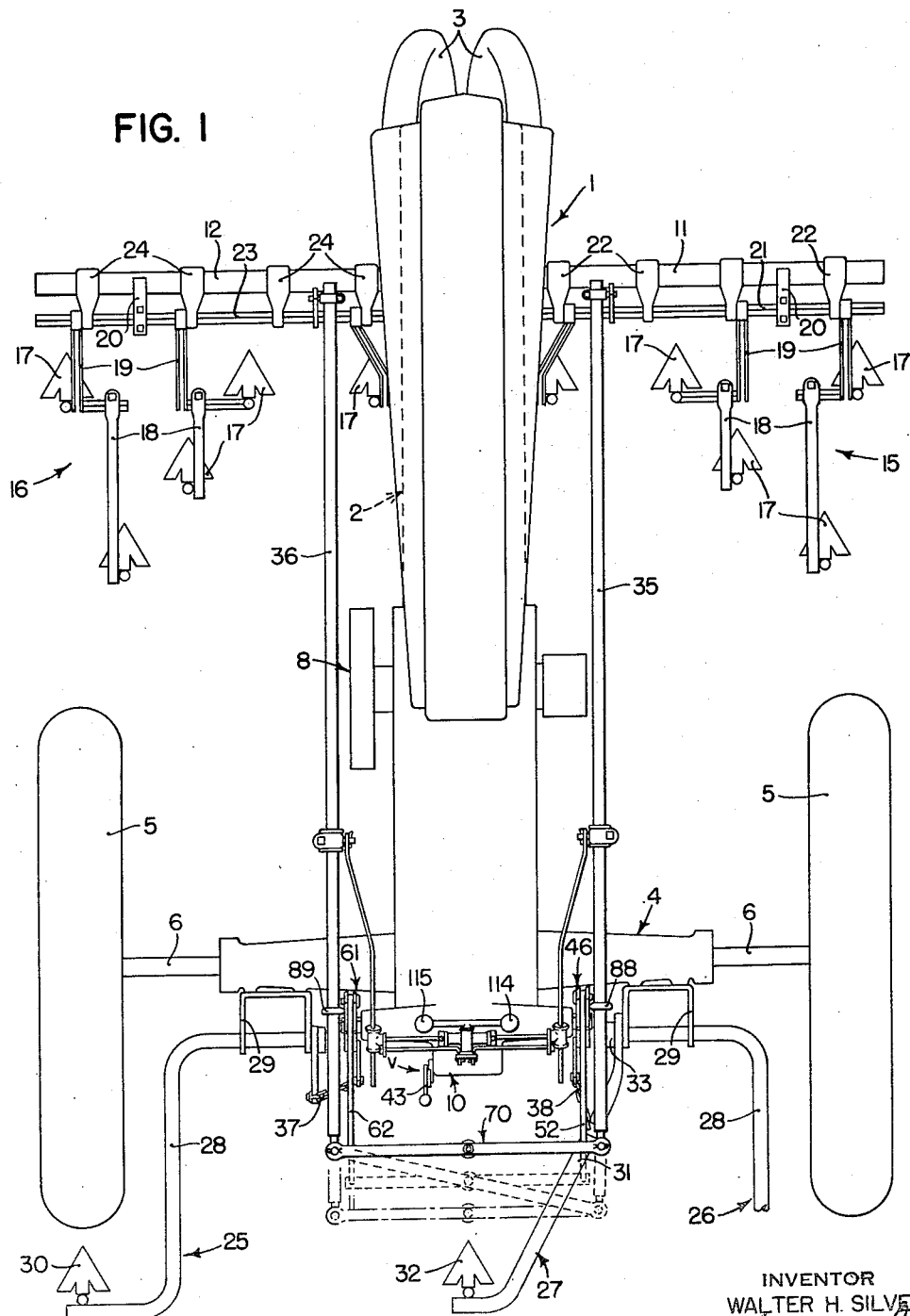

Referring now to the drawings, the present invention is shown as embodied in a tractor-mounted cultivator in which the tractor is indicated in its entirety by the reference numeral 1 and includes a frame 2, front wheel structure 3, a rear axle structure 4, and rear wheels 5 connected to axle shafts 6 that are supported in the rear axle structure 4 in the usual manner. The tractor motor is indicated at 8 and is connected not only to propel the tractor but also to actuate a power lift unit that is indicated in its entirety by the reference numeral 10 to which more detailed reference will be made below.

The tractor 1 adjacent its forward end carries two laterally outwardly extending draft bars 11 and 12. Preferably, each is in the form of a pipe member secured, as by welding, to the inner end of an attaching plate by which the associated draft bar, 11 or 12, is mounted on the frame of the tractor. The draft bars 11 and 12 thus provide means by which tools may be connected in draft transmitting relation and in supported relation with respect to the tractor 1. According to the present invention, the tools are separately actuated, and to facilitate disclosure of the invention I have shown the tools as in the form of two separate relatively shiftable groups of tools or tool means, indicated at 15 and 16, respectively. Each group or set of tool means, as illustrated, includes a plurality of cultivator shovels 17 mounted on tool bars 18 that are connected by parallel link means 19 with the associated draft bars 11 and 12. The right hand set of tools 15 is adapted to be raised and lowered by means of a rockshaft 21 supported in brackets 22 on the right hand draft bar 11. An arm 20 on the rockshaft 21 engages the bar 11 to limit the upward movement of the tools 15. Similar means is provided for limiting the upward movement of the tools 16. The shovels 17, together with the bars 18 and associated parts, are commonly referred to as cultivator rigs. The two groups of tools, indicated at 15 and 16, may be considered generally as a pair of operating units, each movable through a given range of movement as defined the two stop arms 20 and associated parts. The left hand set of tools, indicated at 16, is mounted in a similar way, as by means including a rockshaft 23 rockably carried by the draft bar 12 in brackets 24.

The major portion of the cultivating is performed by the right and left hand tool units, just described, but, if desired, rear tools, such as those indicated at 25, 26 and 27 may be provided for cultivating in rear of the front and rear wheels of the tractor. The rear set 25 includes a tool bar 28 pivoted on a bracket 29 that is fixed in any suitable manner to the left hand extension of the rear axle structure 4. The tool bar 28 carries a cultivator shovel 30 that is disposed substantially rearwardly of the left hand rear wheel 5. The right hand tool unit 26 is of similar construction and is supported in the manner just described. The tool unit 27 includes a tool bar 31 that carries a shovel 32 and is connected, as at 33, to the laterally inner end of the tool bar 28 of the right hand unit 26, whereby the shovel (not shown) carried by the right hand tool bar 28 and the shovel 32 carried by the tool bar 31 move together and are held in substantially rigid relationship. The shovel 32 is disposed substantially in line with the front wheel structure 3.

The front and rear tool units are connected to be raised and lowered together by means that includes a pair of lift pipes 35 and 36 which are connected between the power lift 10 of the tractor and the front sets or units of tools 15 and 16, respectively. The power lift 10 is also connected by a pair of chains 37 and 38 with the rear tools 25, 26 and 27, so that by actuating the single power lift unit 10, all of the tools may be raised and lowered at the same time, if desired.

The implement and cultivator constructions as so far described are largely conventional, being similar to that shown in the prior United States Patent No. 2,033,380, issued March 10, 1936, to T. W. Johnson, to which reference may be made if necessary. The present invention is more particularly concerned with the provision of means making it possible to utilize a single power lift unit, such as is indicated at 10, in cooperation with separate or individual controls for the tools at either side of the tractor whereby the tool unit or units at one side of the tractor may be raised independently of the tool unit or units at the other side of the tractor. This is particularly necessary when cultivating point rows, where it is especially desirable to have the tools at one side of the row operate a short distance along the row after the tools at the other side have been raised.

Referring now more particularly to Figures 1, 2 and 3, the power lift unit 10 includes a transversely disposed rockshaft 41 that extends outwardly at opposite ends of a housing 42 that forms a part of the power lift unit 10. The particular details of the power lift unit do not per se form any part of the present invention except that the power lift unit is preferably of the type that is responsive to an abnormal increase in the load for automatically returning the operating hand lever to a neutral position. One of such types of power lift units is shown in the co-pending application, Serial No. 434,256, filed March 11, 1942, by Frank T. Court, now U. S. Patent 2,423,485, dated July 8, 1947, to which reference may be made if necessary. Briefly, such a power lift unit includes hydraulic power actuated means for rocking the rockshaft 41 from one position to another, with the controlling valve mechanism v, which is under the control of a hand lever 43 (Figure 2), arranged so that when the pressure in the system increases to an abnormal amount, the hand lever 43 is automatically returned to a neutral position in which the pressure in the system is relieved but the load remains hydraulically locked in a raised or partially raised position. Another type of power lift that may be employed is shown in the United States Patent 2,340,474, issued February 1, 1944 to Jay D. Johnson. In both cases, the rockshaft 41 would be connected to the piston of a hydraulic ram unit actuated by a suitable pump driven from the tractor and the control of valve mechanism which, as stated, is automatically returned to neutral position upon the occurrence of an overload in the system. The particular manner in which a hydraulic unit of this kind is employed in the present invention will be explained below.

Two separately controlled sets of connections are provided between the transverse power lift rockshaft 41 and the right and left hand tools, and since the connections at one side are substantially identical with the connections at the other side, only one set will be described in detail. Referring now more particularly to Figures 2 and 3, the right end of the power lift rockshaft 41 receives a lifting arm 46 which is secured to the rockshaft 41 by a U-bolt 47 or other suitable means. Preferably, the arm 46 is in the form of a pair of straps or a U-shaped member, as desired, the ends 48 of which are spaced apart laterally and apertured to receive a pin 51. The forward end of a link 52 is connected with the pin 51 and at its rear end is formed with a downturned portion 53 that is inserted in an opening in the right end of an equalizing lever 56 (Figure 4). The link 52 is held connected with the equalizing lever 56 by a cotter 57. Similarly, the left end of the power lift rockshaft 41 carries a lifting arm 61, preferably of like construction, the upper end of which is pivotally connected to the front end of a link 62, the rear end of which is connected to the left end of the equalizing bar 56, as indicated at 63 in Figure 2. Thus, whenever the rockshaft 41 is rocked from one position to another, the rockshaft being shown in its forward or raised position in Figure 3, the equalizing bar 56 is moved generally bodily forwardly from the dotted line position shown in Figure 1 to the position shown in full lines.

The intermediate portion of the equalizing lever 56 carries a pin 66 rigidly secured thereto in any suitable manner, as by welding, and a pair of resilient members 67, preferably in the form of resilient rubber bushings or the like, are disposed, respectively, on opposite sides of the lever 56. A second equalizing structure, indicated in its entirety by the reference numeral 70, is pivoted at its midpoint on the vertical pin 66, the equalizing structure 70 preferably comprising an upper bar 71 and a lower bar 72, each apertured centrally to receive, respectively, the upper and lower ends of the pin 66. Each of the bars 71 and 72 carries a cam member 73 which is notched, as at 75, to receive an associated cross pin 76 carried by the vertical pin 66. Preferably, the cam members 73 are fixed as by welding to the associated bars, as shown in Figure 4. The right ends of the bars 71 and 72 are rigidly secured together by a sleeve 81, the ends of which are preferably welded to the bars. The right sleeve 81 receives the upturned end 82 of a rod 83 that is secured as by welding to the rear end of the associated right hand lift pipe 35. The left hand lift pipe 36 carries a similar rod 85 the upturned end 86 of which is similarly disposed in a sleeve welded to the left ends of the upper and lower bars 71 and 72. At the right side of the machine, the rear end of the lift pipe 35 is supported by a swivel eye 88 carried by the right hand power lift arm 46, and similarly, the rear end of the left hand lift pipe 36 is supported on the arm 61 by a swivel eye 89. As indicated in Figure 2, when the bar 56, connected at its ends through links 52 and 62 with the rockshaft 41, is moved bodily forwardly, as from the dotted line position shown in Figure 2, the raising forces are transmitted through the pin 66 to the equalizing structure 70, whereupon the right and left hand lift pipes 35 and 36 are both shifted forwardly, thereby raising both the right and left hand tool units 15 and 16. The pins 76 held by the resilience of the members 67 in the notches 75, act to prevent undesired movement of either lifting pipe 35 or 36 relative to the other. If, however, one of the lifting pipes is held against movement, the effective power of the lifting unit 10 is diverted to the lift pipe that is free for movement, thereby holding one of the units against movement is effective to cause the raising of the other unit. Likewise, if both units are in their raised position, holding one of the units against movement while releasing the power lift mechanism permits the other unit to lower. In this action, the evener bar structure 70 and associated parts serve as means differentially connecting the single power unit 10 with the two tool units for raising or lowering either or both, at the option of the operator.

The locking or latching means associated with each unit will now be described. Referring first to the right hand tool unit, the lifting pipe 35 carries a collar 91, suitably secured thereto as by a clamping bolt 92. The collar 91 carries a pin 93 that receives the eye at the forward end of a link 95. The link is formed as shown in Figure 2 and extends at its rear end portion through a sleeve 96 which has a rearwardly directed lug 97 that is bolted, as at 98, to the right end of a control rod 99. Similar structure is associated with the left hand lifting pipe 36, the latter carrying a collar 101 having a stud 103 on which the forward end of a link 105 is pivoted. The rear end of the link 105 extends through a sleeve 106 secured in a similar manner to a control rod 109, being bolted thereto as indicated at 108. The laterally inner ends of the control rods 99 and 109 are turned rearwardly, as indicated at 110, and are thus pivotally connected to a rocking plate 111 welded to the rear end of a shaft 112. A control member 113 is fixed to the forward end of the shaft 112 and is provided with a right hand foot pedal section 114 and a left hand foot pedal section 115. The shaft 112 is received in a supporting member 118 that is carried by the tractor, preferably being provided with a transverse sleeve section 119 that is disposed between a pair of lugs 121 and 122 that are formed on or carried by the power lift housing 42. A transverse shaft member 124 extends through the lugs 121 and 122 and the sleeve 119, being secured in place by set screws 125. The right and left hand ends of the shaft member 124 are received, respectively, in transverse socket sections 127 and 128 which are formed on or carried by the sleeve members 96 and 106, and the ends of the shaft member 124 are sharpened, serrated, or otherwise formed to facilitate frictionally engaging the associated rods 95 and 105. Referring for the moment to Figure 6, it will be seen that if the operator steps on the right hand pedal section 114, the plate 111 will be rocked in a clockwise direction, exerting a pull through the control rod 99 and forcing the sleeve section 96 and the rod 95 carried thereby toward the left, into clamping engagement with the right end of the fixed shaft member 124, thus holding the link member 95, together with the associated right hand lifting pipe 35, against movement. In similar manner, stepping on the left hand pedal section 115, clamps the left hand link 105 and the associated left hand lifting pipe 36 against movement.

The operation of the invention as so far described is substantially as follows.

Figure 1 shows the cultivator in a raised or inoperative position, both the right and left hand tools, both front and rear, being held in raised position by the power lift unit 10. A control lever 43 of the latter may be turned at any time desired into a lowering position in which either or both sets of right and left hand tools will be lowered. Assuming that the operator is cultivating point rows and that at the beginning of the rows to be cultivated he desires to lower the right hand tools before the left hand tools, the operator will first step on the left hand pedal section 115, thus holding the left hand lift pipe 36 against movement. He will then move the power lift control lever 43 into a lowering position, which will permit the right hand tools to lower, the lift pipe 35 moving rearwardly and the equalizing bars taking the positions indicated in dotted lines in Figure 1. After the outfit has traveled the desired distance with the right hand tools only in operating position, the left hand tools may be lowered into operating position merely by the operator releasing the foot pedal 115. The left hand tools then move by gravity into an operating position, the lift pipe 36 moving rearwardly so that the equalizing bars take the positions indicated by the dot and dash lines in Figure 1. Substantially the reverse action takes place at the end of the point rows where it may be desired to raise the right hand tools while permitting the left hand tools to remain in operating position for an additional distance along the rows. In that event, the operator again steps on the pedal 115, clamping or locking the left hand lift pipe 36 against movement. Then the operator will actuate the power lift lever 43, causing all of the power of the power lift unit 10 to be diverted to the right hand lifting part 35, thus shifting the latter forwardly and raising the right hand tools, the equalizing bars and associated parts taking the position indicated in dotted lines in Figure 2. Either of the power lift units disclosed in the above-identified co-pending applications may be employed and each will operate in the following manner. When the left hand tools are locked in their lowered position and the power lift unit energized, the power lift mechanism remains in operation until the right hand tools reach their raised position, at which time no further movement is possible. This momentarily causes an overload in the hydraulic system of the power lift unit but the mechansim of the control means therefore is arranged so that this momentary abnormal increase in pressure acts to automatically return the control lever of the power lift unit to a neutral position, thus relieving the high pressure and at the same time hydraulically locking the raised tools in their raised position. After the outfit has traversed the desired distance, the operator then again actuates the power lift unit 10, causing it to raise the left hand tools, the equalizing bar structures swinging in the direction indicated by the arrow in Figure 2 and eventually reaching the position shown in full lines (Figures 1 and 2), the hydraulic power lift unit again automatically returning the control valve to neutral position when the left hand tools reach their fully raised position. It will be seen that if it should be desired to lower the left hand tools before the right hand tools and also raise the left hand tools before the right hand tools, substantially the reverse operation of the lift pipe clamping means will be performed. It will also be noted that for operation with this type of control, the power lift means should be so constructed that it can be operated in two stages or ranges, and so constructed that it may be locked in an intermediate position in order to hold one set of tools in raised position while accommodating the disposition of the other tools in their lowered position. Preferably, also, the power lift unit 10 is so constructed that when the lift pipe clamping means are both released, the power lift unit 10 may be operated to raise or lower the tools by different amounts in their operating positions so as to provide for depth adjustments. If desired, any other suitable means may be provided for adjusting the operating positions of the tools, such as, for example, the adjustable hand lever controlled stop means shown in U. S. Patent No. 1,958,625, issued May 15, 1934, to Theodore W. Johnson.

Another form of the present invention is shown in Figures 7 and 8. In the form of the invention shown in Figure 1 et seq., the differential mechanism, connected between the single power lift unit and the two tool units, is disposed exteriorly of the tractor, as are the two locking units. In the form of the invention shown in Figures 7 and 8, the differential mechanism and the locking mechanism are disposed within the housing of the tractor, more specifically, in the housing that encloses the power lift unit. The form of the invention shown in Figures 7 and 8 is therefore incorporated more easily when the tractor is manufactured whereas the form of the invention shown in Figure 1 et seq., may be manufactured and marketed as a part of the cultivating implement, or as an after market attachment or addition to existing tractors and cultivators. The form of the invention shown in Figures 7 and 8 is disclosed in detail and claimed in my continuation-in-part application, now United States Patent 2,409,228, issued October 15, 1946.

Referring now more particularly to Figures 7 and 8, the tractor T includes a rear axle housing 135 to the rear of which a power lift housing 136 is secured, the latter including a hydraulic cylinder 137 that extends into the interior of the rear axle housing 135. This construction is similar to that shown in U. S. Patent No. 2,107,760, issued February 8, 1938, to Elmer McCormick et al., to which reference may be made if necessary. Movably disposed within the cylinder 137 is a piston 141 to which the front end of a connecting rod 142 is pivoted, as at 143. Fluid under pressure is directed into the front end of the cylinder 137, forward of the piston 141, and is under the control of valve mechanism V which preferably is like that shown in the above-mentioned Court patent, being of the type in which an abnormal increase in pressure in the system, regardless of the position of the piston in the cylinder, automatically returns the valve mechanism to a neutral position in which fluid is hydraulically locked in the cylinder.

The rear end of the connecting link 142 is connected by a pin 147 with an arm 148. The arm 148 is provided with a pair of trunnions 149 which are seated, respectively, in sockets 150 formed in the inner ends of sleeves 151 that are fixed, respectively, to the squared ends 152 of a pair of right and left hand rockshafts 153 and 154. The rockshafts are mounted in coaxial relation in extensions 155 and 156 which form a part of the power lift housing 136. Thus, the arm 148 is mounted for swinging movement in between the inner ends of the rockshafts 153 and 154 and is movable with respect thereto. At its upper end the arm 148 is formed with or carries a spindle 158 on which a pinion 159 is mounted for rotation. The spindle 158 meshes with a pair of sectors 161 which are formed on or carried by the inner ends of the sleeves 151. A cotter 163 holds the pinion 159 in place on the spindle 158.

A locking device 165 is provided for each of the rockshafts 153 and 154 and is disposed, as best shown in Figure 7, within the housing 136. Each locking device 165 comprises a brake band 166 anchored, as at 167 (Figure 8), to a stationary part of the housing and connected at its other end with a rod 168 that extends out of the housing forwardly and is connected to a brake pedal 169. Each locking device 165 is formed as just described, hence the description of one will suffice. Each brake pedal 169 has a latching plate 171 pivoted thereto and provided with teeth which cooperate with a locking plate 173 secured to the upper portion of the housing. The latch plates 171, or either of them, may be turned into the dotted line position (Figure 8) in which it is inoperative, but when the plate is disposed in its full line position the teeth thereof are adapted to engage the stationary plate 173 so as to hold the brake band 166 in locking position. Each brake band 166 carries the usual lining and is disposed about the associated sleeve 151 on the inner squared end 152 of the associated rockshaft. The outer ends of the rockshafts 153 and 154 are squared, as at 181, and are thus adapted to receive the lifting arms 46 and 61 (Figure 2) or similar lifting arms. In Figure 7, the arm 46 is provided with the swivel eye 88 best shown in Figures 2 and 3, and in this form of the invention the associated lift pipe 35 carries a set screw collar 185 forward of the swivel eye 88 so that when the rockshaft 153 is rocked to swing the arm 46 forwardly, the swivel eye 88 engages the collar 185 and shifts the lift pipe 35 forwardly. The lift pipe connection at the other side of the tractor T is of like construction.

The operation of this form of the invention is substantially the same as described above in connection with the form of the invention shown in Figure 1 et seq. The power lift unit of Figures 7 and 8, including the cylinder 137 and piston 141, when operated serves to rock both of the rockshafts 153 and 154, thus lifting both sets of tools associated therewith, unless the operator steps on one of the foot pedals 169 to apply the brake 165 associated with one of the rockshafts. In that case, the power lift unit rocks only the other power lift shaft. When the power lift unit is again actuated the first rockshaft may then be rocked so that both sets of tools are then raised. Either set may be lowered independently of the other set by stepping on one of the foot pedals to lock the associated rockshaft against movement and then releasing the hydraulic fluid from the cylinder 137. This permits the other rockshaft to lower, the first rockshaft being held in its raised position so long as the operator presses on the foot pedal 169 or so long as the foot pedal 169 is retained in its lock-applied position by the associated latch plate 171.

It is not essential to the present invention to employ power lift mechanism having the feature of the valve automatically returning to neutral upon the occurrence of an overload. For example, hydraulic lift mechanism may be employed in which there is simply a relief valve, such as is shown in the McCormick et al. patent, identified above. When employing hydraulic lift mechanism in which an overload relief valve is provided, when the operator desires to raise only one of the cultivator units, he actuates the brake or clamping device associated with the other unit in order to hold the latter in lowered position, and then he actuates the power lift mechanism. When the first mentioned cultivator unit reaches its raised position and can move no higher, the relief valve opens and remains open for the length of time that it is desired to hold the other cultivator unit in lowered position. As soon as that distance has been traversed, the operator merely releases the brake or clamping device, and without further attention to the power lift, the other cultivator unit will then be moved into its raised position. An arrangement of this kind has one advantage over previously described arrangements in that it is not necessary to actuate the power lift the second time when raising the last cultivator unit.

It is not essential, however, to the present invention that the power lift valve and associated mechanisms be such that the valve is automatically returned to a neutral position upon an abnormal increase in pressure or that a relief valve be provided, so far as the present invention is concerned, since, if desired, the operator may manually stop the raising of the power lift unit by operating the lever 43 at the desired point when one cultivator unit is moved into its raised position while he is holding the other unit down in its operating position.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim and desire to secure by Letters Patent is:

1. A two-row tractor cultivator comprising laterally spaced tools for cultivating two crop rows, means connecting said cultivating tools to said tractor for independent movement relative to each other, means connected with each tool for raising the same, a single power lift unit mounted on and deriving operating energy from the tractor, means serving as a lever connected at a midpoint with said power lift unit to be actuated thereby, means swingably connecting one outer portion of said lever means with one of said tool-raising means, means swingably connecting the opposite outer portion of said lever means with the other of said tool-raising means, and releasable holding means carried by said tractor for holding either of said tools against movement, whereby the operation of said power lift reacts through said lever means against the holding means for one tool for raising the other tool.

2. A two-row tractor cultivator comprising laterally spaced tools for cultivating two crop rows, means connecting said cultivating tools to said tractor for independent movement relative to each other, separate means connected with said tools, respectively, for raising them, lever means having intermediate and end portions and connected at its end portions, respectively, with said separate raising means, a power lift unit operative through two ranges and connected with the intermediate portion of said lever means, and releasable holding means carried by said tractor for holding either of said tools against movement, operation of said power lift through one range acting to raise the other tool and movement of said power lift through said other range acting, when said releasable holding means is released, for raising said one tool.

3. In a two-row tractor cultivator including laterally spaced tools carried by the tractor for independent generally vertical movement relative to the tractor and to each other, the combination therewith of a pair of separately operable means, one connected with each tool for raising the same, a single power lift unit carried by and deriving operating energy from the tractor, differential means of the type having one portion to which power may be applied and two parts to which the power is delivered, either divided between the two parts or delivered all to one part if the other is held against movement, means connecting said power lift unit with said power receiving portion of the differential means, means respectively connecting said separate raising means with said two parts of said differential means, and releasable holding means connected with said parts for holding either of said tools in a lowered operating position, whereby when the power lift unit is actuated said differential means reacts through the raising means connected to the held tool and the associated part of differential means against the tool so held for raising the other tool.

4. In a tractor cultivator of the type in which the tractor includes a power lift rockshaft and the cultivator includes a pair of separately movable cultivator rigs, a delayed lift mechanism comprising an evener lever connected at its ends with said separately movable rigs, a pivotal connection between the central part of said evener lever and said power lift rockshaft, a pair of members respectively connected with said cultivator rigs to be moved when the latter are shifted, and a pair of optionally actuable holding means mounted on the tractor and engageable respectively with said pair of members for holding either of said members and the associated rig in one position.

5. A tractor mounted agricultural implement adapted to be mounted on a tractor having a power lift unit deriving operating energy from the tractor, said implement comprising a pair of operating units, means for limiting the movement of each operating unit to a given range of movement, means connected with said power unit and moved thereby through a given range of movement by power derived from said power unit, means connected with the power operated means and operative by movement of the latter through a part of the range of movement of said power operated means for moving one of said operating units through its entire range of movement, and means operative by a completion of the movement of the power operated means for moving the other operating unit through its entire range of movement.

6. A two-row tractor cultivator adapted to be mounted on a tractor having a power lift, comprising independently movable right and left hand cultivator rigs, a longitudinally disposed lifting member connected at its forward end to each of said cultivator rigs and mounted for longitudinal movement relative to the tractor for raising and lowering said rigs, a transverse link member pivotally connected at its outer ends to said lifting members, respectively, means for connecting the mid-point of said transverse link with the tractor power lift whereby operation of the latter may be utilized to raise either or both of said rigs, and a pair of optionally operable locking mechanisms, one operatively connected with each of said lifting members and either adapted when actuated to lock the associated lifting member against movement whereby operation of said power lift serves to actuate moving the other lifting member.

7. A two-row tractor cultivator adapted to be mounted on a tractor having a power lift, said cultivator comprising a pair of independently movable rigs carried at opposite sides of the tractor, a pair of longitudinally movable members, each connected with one of said rigs for raising and lowering it, differentially acting means operatively connecting the rear ends of said lifting members with said power lift, a link pivoted at its forward end to each of said lifting members and extending rearwardly, and a pair of separately actuable locks operatively associated, respectively, with the rear ends of said links whereby either of the latter may be locked against movement to hold the associated lifting member and rig against movement, actuation of said power lift acting through said differential means for operating the other lifting member and the rig associated therewith.

8. The invention set forth in claim 8, further characterized by said locking mechanism comprising a member fixed to the rear portion of the tractor in generally stationary relationship and having at its laterally outer ends members slidably receiving said links, and means associated with said stationary member for clamping either of said links in the associated member receiving it so as to hold that link against movement.

9. A two-row tractor cultivator adapted to be mounted on a tractor having a power lift adjacent the rear portion of the tractor, said cultivator comprising independently movable right and left hand cultivator rigs mounted adjacent the forward end of the tractor, a pair of rearwardly extending lifting members operatively connected at their forward ends with said cultivator rigs, respectively, a link member pivotally connected at its ends to the rear ends of said lifting members, means connecting the intermediate portion of said link member with said tractor power lift, whereby operation of the latter may be utilized to raise either or both of said rigs, a swingable member mounted adjacent the rear portion of the tractor for movement relative thereto about a generally longitudinal axis, said member having right and left foot pedal portions, a pair of clamping units, one associated with each of said lifting members, means connecting one of said clamping units with the member having said right and left foot pedal portions, and means connecting the other of said clamping units with said last mentioned member, whereby one or the other of said clamping units may be operated by movement of said swingable member in one direction or the other, respectively.

10. A cultivator adapted to be mounted on a tractor having a power unit which includes a single member operable successively in the same general direction through two ranges of movement, a pair of cultivating tool units, one at each side of the tractor, means connecting said tool units with the tractor for independent movement relative thereto, each through a given range of movement between raised and lowered positions, means connected with said power operated member and including a first part operated by movement of the power operated member through one of its ranges of movement and a second part operated by movement of the power operated member through its other range of movement, means connecting said first part to one of said tool units for moving said one of said cultivating tool units through its entire range of movement, and means connecting the other part to the other of said tool units for moving said other cultivating tool unit through its entire range of movement.

WALTER H. SILVER.

REFERENCES CITED

The following references are of record in the file of this patent:

UNITED STATES PATENTS

| Number | Name | Date |
|---|---|---|
| 1,911,373 | Lindgren et al. | May 30, 1933 |
| 2,336,062 | Brown et al. | Dec. 7, 1943 |
| 1,974,520 | Stewart | Sept. 25, 1934 |
| 624,810 | Hunt | May 9, 1899 |

Certificate of Correction

Patent No. 2,426,530. August 26, 1947.

WALTER H. SILVER

It is hereby certified that error appears in the printed specification of the above numbered patent requiring correction as follows: Column 11, line 37, claim 8, for the claim reference numeral "8" read 7; and that the said Letters Patent should be read with this correction therein that the same may conform to the record of the case in the Patent Office.

Signed and sealed this 11th day of November, A. D. 1947.

[SEAL]

THOMAS F. MURPHY,
*Assistant Commissioner of Patents.*